(12) United States Patent
Powell (10) Patent No.: US 10,191,188 B2
(45) Date of Patent: Jan. 29, 2019

(54) ARRAY-BASED IMAGING RELAY

(71) Applicant: Microsoft Technology Licensing, LLC, Redmond, WA (US)

(72) Inventor: Karlton D. Powell, Lake Stevens, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 151 days.

(21) Appl. No.: 15/064,046

(22) Filed: Mar. 8, 2016

(65) Prior Publication Data

US 2017/0261650 A1  Sep. 14, 2017

(51) Int. Cl.
| | |
|---|---|
| *G02B 27/10* | (2006.01) |
| *G02B 3/00* | (2006.01) |
| *F21V 8/00* | (2006.01) |
| *G02B 27/30* | (2006.01) |

(Continued)

(52) U.S. Cl.
CPC ......... *G02B 3/0062* (2013.01); *G02B 3/0087* (2013.01); *G02B 6/0046* (2013.01); *G02B 27/2292* (2013.01); *G02B 27/30* (2013.01); *G06K 9/00033* (2013.01); *G06K 9/00046* (2013.01)

(58) Field of Classification Search
CPC .......... G02B 3/0062; G02B 2027/0123; G02B 27/0961; G02B 27/017; G02B 27/0927; G02B 27/283; G02B 6/0046; G02B 27/10; H04N 9/3129; H04N 5/2254; H04N 5/23212; H04N 5/3415; G03H 1/02; G02F 1/133526

See application file for complete search history.

(56) References Cited

U.S. PATENT DOCUMENTS

| | | | |
|---|---|---|---|
| 2,351,034 | A | 6/1944 | Gabor |
| 5,291,334 | A | 3/1994 | Wirth et al. |

(Continued)

FOREIGN PATENT DOCUMENTS

| | | |
|---|---|---|
| KR | 20090009588 | 1/2009 |
| KR | 20140012396 | 2/2014 |

(Continued)

OTHER PUBLICATIONS

"Anti-reflective glass (AR-Glass)", Retrieved on: Aug. 25, 2015 Available at: http://biz.everychina.com/shanghai_manbo-r/z6504064-ag_glass_anti_glare_glass.html.

(Continued)

*Primary Examiner* — William R Alexander
*Assistant Examiner* — Balram T Parbadia
(74) *Attorney, Agent, or Firm* — Ray Quinney & Nebeker P.C.; Paul N. Taylor (57) ABSTRACT

A lens system includes a first lens array assembly including a first plurality of cells, each cell of the first plurality of cells configured to exhibit a pair of Fourier transform lenses, and a second lens array assembly including a second plurality of cells, each cell of the second plurality of cells configured to exhibit a pair of Fourier transform lenses. The first and second lens array assemblies are positioned relative to one another along an optical axis of the lens system such that an image of an object is provided at an image conjugate distance from the second lens array assembly.

20 Claims, 6 Drawing Sheets

(51) Int. Cl.
  G06K 9/00    (2006.01)
  G02B 27/22   (2018.01)

(56) References Cited

U.S. PATENT DOCUMENTS

| | | | |
|---|---|---|---|
| 5,579,161 A * | 11/1996 | Sekiguchi | G02B 27/0101 359/559 |
| 5,600,666 A * | 2/1997 | Hiiro | G02B 3/005 372/100 |
| 5,621,572 A | 4/1997 | Fergason | |
| 5,731,899 A | 3/1998 | Meyers | |
| 5,973,844 A | 10/1999 | Burger | |
| 6,002,829 A * | 12/1999 | Winston | F21V 5/02 385/129 |
| 6,341,136 B1 * | 1/2002 | Hiiro | G02B 27/0961 372/100 |
| 6,381,072 B1 | 4/2002 | Burger | |
| 6,796,656 B1 | 9/2004 | Dadourian | |
| 6,842,297 B2 | 1/2005 | Dowski, Jr. | |
| 6,937,221 B2 | 8/2005 | Lippert et al. | |
| 6,975,786 B1 * | 12/2005 | Warr | G02B 5/32 359/15 |
| 7,042,645 B2 | 5/2006 | Houlihan et al. | |
| 7,116,405 B2 | 10/2006 | Johnson | |
| 7,186,004 B2 | 3/2007 | Powell et al. | |
| 7,274,808 B2 | 9/2007 | Baharav et al. | |
| 7,589,900 B1 | 9/2009 | Powell | |
| 7,839,573 B2 * | 11/2010 | Wippermann | G02B 27/01 359/619 |
| 7,956,924 B2 | 6/2011 | Georgiev | |
| 7,986,315 B2 | 7/2011 | Sprague et al. | |
| 8,120,858 B2 | 2/2012 | Choi et al. | |
| 8,622,549 B2 | 1/2014 | Linden et al. | |
| 8,670,171 B2 | 3/2014 | Martin et al. | |
| 8,711,466 B2 | 4/2014 | Kroll et al. | |
| 9,030,503 B2 | 5/2015 | Moore | |
| 9,049,381 B2 | 6/2015 | Venkataraman et al. | |
| 2002/0034014 A1 | 3/2002 | Gretton et al. | |
| 2004/0013341 A1 * | 1/2004 | Hall | H04B 10/801 385/16 |
| 2005/0248849 A1 | 11/2005 | Urey et al. | |
| 2007/0103747 A1 | 5/2007 | Powell et al. | |
| 2007/0159700 A1 * | 7/2007 | Danner | G02B 3/0068 359/626 |
| 2008/0001850 A1 | 1/2008 | Champion et al. | |
| 2009/0190098 A1 | 7/2009 | DeJong et al. | |
| 2009/0231698 A1 | 9/2009 | Hashimoto et al. | |
| 2009/0262182 A1 | 10/2009 | Javidi et al. | |
| 2010/0079861 A1 | 4/2010 | Powell | |
| 2010/0245345 A1 | 9/2010 | Tomisawa et al. | |
| 2010/0315597 A1 | 12/2010 | Powell et al. | |
| 2011/0313560 A1 * | 12/2011 | Hangaard | B33Y 40/00 700/120 |
| 2012/0105310 A1 | 5/2012 | Sverdrup et al. | |
| 2012/0127128 A1 * | 5/2012 | Large | G06F 3/0425 345/175 |
| 2013/0003022 A1 | 1/2013 | Tanaka et al. | |
| 2013/0285885 A1 | 10/2013 | Nowatzyk et al. | |
| 2013/0341493 A1 | 12/2013 | Ando et al. | |
| 2014/0376097 A1 | 12/2014 | Yamashita et al. | |
| 2015/0049383 A1 | 2/2015 | Janins et al. | |

FOREIGN PATENT DOCUMENTS

| WO | 2014048999 A1 | 4/2014 |
|---|---|---|
| WO | 2014133481 | 9/2014 |

OTHER PUBLICATIONS

"International Search Report & Written Opinion Issued in PCT Application No. PCT/US2017/020058", dated Jun. 1, 2017, 13 Pages.

"International Search Report & Written Opinion Issued in PCT Application No. PCT/US2017/020059", dated Jun. 1, 2017, 17 Pages.

Aldalali, et al., "A micro camera utilizing a microlens array for multiple viewpoint imaging", In Proceedings of 16th International Solid-State Sensors, Actuators and Microsystems Conference, Jun. 5, 2011, 4 pages.

Brady, et al., "Multiscale lens design", In Proceedings of Optics Express, vol. 17, No. 13, Jun. 10, 2009, pp. 10659-10674.

Hembd-Sölner, et al., "Imaging properties of the Gabor superlens", In Journal of Optics A: Pure and Applied Optics vol. 1 No. 1, Jan. 1991, 2 pages.

Mungan, C.E., "The Cat's Eye Retroreflector", Retrieved on: Dec. 7, 2015, Available at: http://www.usna.edu/Users/physics/mungan/_files/documents/Scholarship/Retroreflector.pdf.

Rajasekharan, et al., "Analysis of an array of micro lenses using Fourier-transform method", In Proceedings of IET Optoelectronics, vol. 4, Issue 5, Oct. 2010, pp. 210-215.

Stollberg, et al., "The Gabor superlens as an alternative waferlevel camera approach inspired by superposition compound eyes of nocturnal insects", In Proceedings of Optics Express, vol. 17, Issue 18, Aug. 31, 2009, pp. 15747-15759.

Tsvetkov. A. D. "Catadioptric Retroreflector", In Journal of Optical Technology, vol. 78, Issue 3, Mar. 2011, 3 pages.

U.S. Appl. No. 14/538,783, Powell, et al., "High Accuracy Corner Cube Arrays for High Resolution Retroreflective Imaging Applications", filed Nov. 11, 2014.

U.S. Appl. No. 14/588,792, Powell, et al., "Retro-Imaging System Having High Efficiency Through Control of Polarization with Minimized Polarization-Filtering Induced Diffractive Artifacts Impacting Resolve", filed Jan. 2, 2015.

Yamamoto et al., "Aerial 3D LED Display by Use of Retroreflective Sheeting", SPIE-IS&T Electronic Imaging, 2013, 8 pages, vol. 8648.

Yamamoto, et al., "Aerial LED signage by use of crossed-mirror array", In Proceedings of SPIE, Advances in Display Technologies III, vol. 8643, Mar. 1, 2013.

Yamamoto, et al., "Design of crossed-mirror array to form floating 3D lens signs", In Proceedings of SPIE, Stereoscopic Displays and Applications XXIII, vol. 8288, Feb. 6, 2012.

Yamamoto, et al., "Floating Aerial LED Signage Based on Aerial Imaging by Retro-Reflection (AIRR)", In Journal of Optics Express, vol. 22, Issue 22, Oct. 23, 2014, pp. 26919-26924.

Yeom, et al., "Viewing window expansion in integral floating display using tilted side mirrors", In Proceedings of 3DTV Conference: The True Vision—Capture, Transmission and Display of 3D Video, May 16, 2011, 4 pages.

"Compact Microoptical Imaging System for Digital Close-Up Imaging", Retrieved on: Jun. 15, 2015, Available at:http://www.iof.fraunhofer.de/content/dam/iof/en/documents/pb/Compact%20Microoptical%20Imaging%20System%20for%20Digital%20Close-Up%20Imaging.pdf.

"SELFOC© Lens Array", Retrieved on: Jun. 15, 2015, Available at: http://welcome.gofoton.com/product/lens_array/.

Bruckner, et al., "Ultra Compact Close up Microoptical Imaging System", In Proceedings of Current Developments in Lens Design and Optical Engineering XI; and Advances in Thin Film Coatings VI, Aug. 19, 2010, 3 pages.

Hakan Urey et al., "Microlens Array-Based Exit Pupil Expander for Full-Color Display Applications", Proceedings of SPIE—the International Society for Optical Engineering, May 2004, 11 pages, vol. 5456.

Lanman, et al., "Near-Eye Light Field Displays", ournal of ACM Transactions on Graphics, Nov. 2013, 10 pages, vol. 36, Issue 6.

Meyer, et al., "Optical Cluster Eye Fabricated on Wafer-Level", Optics Express, Aug. 22, 2011, pp. 17506-17519, vol. 19, Issue 18.

Park, et al., "Compact Near-Eye Display System Using a Superlens-based Microlens Array Magnifier", IEEE 28th International Conference on Micro Electro Mechanical Systems, Jan. 18, 2015, pp. 952-955.

Shaoulov, et al., "Compact Microlenslet-Array-Based Magnifier", Optics Letters, Apr. 1, 2004, pp. 709-711, vol. 29, Issue 7.

(56) References Cited

OTHER PUBLICATIONS

Spring et al., "Confocal Microscope Scanning Systems", Available at: http://www.olympusconfocal.com/theory/confocalscanningsystems.html.
Wu et al., "100% Fill-Factor Aspheric Microlens Arrays (AMLA) With Sub-20-nm Precision", IEEE Photonics Technology Letters, Aug. 18, 2009, pp. 1535-1537, vol. 21, Issue 20.

* cited by examiner

ARRAY-BASED IMAGING RELAY

DESCRIPTION OF THE DRAWING FIGURES

For a more complete understanding of the disclosure, reference is made to the following detailed description and accompanying drawing figures, in which like reference numerals may be used to identify like elements in the figures.

The disclosed devices may assume various forms. Specific examples are illustrated in the drawing (and are hereafter described) with the understanding that the disclosure is intended to be illustrative, and is not intended to limit the invention to the specific examples described and illustrated herein.

DETAILED DESCRIPTION

Relayed imaging involves the transfer of light of an object such as a source, mask or sample to a photodetector array, substrate, or other image sensor or light-sensitive medium. Optical relay systems, such as arrays of graded index (GRIN) rod lenses, have been used in printers and facsimile machines. The rods have a certain length to allow their parabolic refractive index profile to image a given conjugate distance. The resulting systems are accordingly often too bulky for many applications. For example, the total conjugate length (the total track length of object plane to image plane) is often in the range of 9 millimeters (mm) to 80 mm.

Lens systems provide relayed imaging via stacks or assemblies of lens arrays, such as microlens arrays (MLAs). The MLAs of the stacks are assembled such that conelets of light are stitched into a complete numerical aperture (NA) without gapping. Erect, high efficiency imaging is achieved. The lens system includes an imaging core of two lens array assemblies. In some cases, each assembly includes a pair of in-tandem MLAs. The MLAs of each pair are, in turn, separated by the focal length of the constituent lenslets (e.g., array elements) of the MLAs. The MLAs may thus be disposed in a compact stack configuration. For example, one imaging relay lens system has a total track length of 4.3 mm. The lens systems are accordingly capable of imaging large areas while avoiding the large volumes and bulky limitations of classical lens systems. The lens systems also provide the relayed imaging with fewer parts than other imaging relays.

The focal length separation of the two in-tandem pairs leads to high efficiency imaging. Each in-tandem pair implements a full, true Fourier transform between position space and angle space (or spatial frequency space). A transformation into angle space is provided by the first pair at an intermediate transform plane between the two pairs. The second pair then implements a second transformation from angle space back to position space to provide the erect image at an image distance determined as a function of (i) the focal lengths of the MLAs, (ii) the pitches of the MLAs, and (iii) the distance between the two pairs, for a given object distance. The function may thus be used to configure the lens system arrangement to form the image at a desired image distance. As described herein, formation of a real, non-inverted image is provided by satisfying the following two constraints: (1) providing consistent imaging conjugate distances within an array element, and (2) convergence of image content across multiple imaging elements within the array.

Implementing a full Fourier transform avoids losses and other distortions by addressing the diffraction arising in connection with each MLA. Without the second MLA for each cell, the transform appears to be a Fourier Transform (FT) in intensity, but not in phase, as a quadratic phase error remains. Phase correction is provided by the second MLA of each pair, which effectively provides telecentric correction of the output. The inner array of each in-tandem FT MLA pair prevents loss and scatter of light having higher spatial frequency content, or light having higher angle of incidence, at the intermediate transform plane. Without phase correction at these inner arrays, a portion of light involved in fully resolving the object (within the diffraction limit defined by lenslet acceptance numerical aperture NA) would be lost. By making use of in-tandem FT MLA pairs, apodization is accordingly avoided, thereby reducing diffractive artifacts and minimizing loss of system resolve or loss of optical performance, such as Modulation Transfer Function (MTF). The fully formed diffraction output of the first in-tandem pair is then fully utilized by the second in-tandem pair to instead improve the efficiency of the lens system and, thus, image quality. Clipping and vignetting are also avoided via the phase correction. The MLA-based lens system is instead capable of stitching conelets of light into a complete numerical aperture (NA) without gaps.

Higher efficiencies may also be attainted due to a higher fill factor of the MLAs. Some microlens arrays are capable of being molded with 100% fill factor. For example, microlens arrays formed by replication using an etched master or diamond machining may achieve 100% fill factor, while microlens arrays formed by photoresist reflow will have flat gaps between lenslets, and microlens arrays formed by grey-scale lithography may exhibit rounded seams at the edges of each lenslet causing scatter. Other solutions, such as GRIN rod arrays, have a 10% loss in fill factor arising from hexagonal packing of round rods. Further, arrays of round lenses have similar gaps in fill factor. By making use of high fill factor types of MLAs or GRIN fiber faceplates from boules, or arrays of lenses each having a shape suitable for tiling, including hexagonal, rectangular and square shapes, high efficiency may be maintained. MLAs may utilize aperture array masking at any plane within the stack to help reduce scatter of input light higher than the acceptance of each lenslet, while EMA absorbing glass or fiber may be utilized periodically within a GRIN fiber array to reduce such scatter.

The arrangement of the MLA pairs provides output without a tiling effect, the so-called lensitization arising from lens system acceptance and pointing angle. The tiling effect is avoided without having to resort to extensive increases in overall system length. The lens systems may therefore be provided in a compact, or thin, form factor (e.g., a stack of sheets or thin films) appropriate for electronic devices, such as phones, tablets, laptops, and other devices having a thin profile for portability and/or other reasons.

The relay imaging of the lens system is capable of being achieved in a non-contact manner. For example, a lens or other optical element is not necessary at the image plane. Such non-contact imaging is useful when imaging through transparent media, e.g., transfers through windows, as in the case of, for instance, fingerprint readers. The lack of contact is also useful in connection with transfers to substrates, as in the case of, for instance, photolithography or transfers to an image sensor such as a microscope.

The lens systems are scalable without increases in system volume. The lens systems are capable of being scaled to handle larger lateral areas without any increase in track length. The thickness of the lens system thus does not increase. The lens systems may also be scaled to accommodate different object conjugate distances without significant increases in volume. Such scaling may also be useful in connection with imaging at short conjugate lengths. For instance, total conjugate lengths less than 9 mm are achievable.

The lens systems are telecentric in some cases. For example, the two in-tandem MLA pairs may be arranged to provide telecentric output for objects that are sufficiently far enough away from the lens system. Telecentric output is achieved without having to rely on a physical layer (e.g., a field lens) at the image plane. The lens systems accordingly avoid introducing mechanical interference issues in connection with, for instance, photolithography (e.g., avoiding contact with the wafer being exposed). In other cases, field correction may be used to achieve symmetric behavior. Input and output may be substantially telecentric. The ability to provide telecentric output avoids distortion and defocusing present in previous lens systems.

The two in-tandem MLA pairs of the lens systems may be arranged to provide unity or non-unity magnification. The respective focal lengths or respective pitches of the MLA pairs differ in non-unity magnification examples.

In some cases, the relay imaging of the lens systems is provided in connection with fingerprint detection. A fingerprint reader includes an imaging relay core having the two in-tandem MLA pairs. Additional MLAs may be used for collimation and/or focusing. Either way, the stack of MLAs remains thin. For instance, the lens system is sufficiently thin to be disposed behind or under the cover glass (or other transparent cover) of an electronic device. The lens system may be scaled laterally to cover the entire area of the finger or thumb.

Although described in connection with fingerprint sensors for portable electronic devices (e.g., tablets having touch-screens), the lens systems are well suited for a wide variety of imaging relay applications and usage scenarios. For example, the imaging relays may be used in scenarios involving a relayed depth from a diffuser, non-contact projection lithography, a scalable mask relay, plane-to-plane and in-plane floating displays, and a display to image focus relay. The lens systems may be used in various thin, large-area image transfer applications, such as microscopes (RDFD), photographic, print imaging, seamless tiling of finite sized displays or object planes, and other applications involving magnification. The relayed imaging provided by the lens systems may also be an integrated component of a microscope. Still further applications and usage scenarios are possible given the polarization independent nature of the relay imaging.

The lens systems are not limited to particular types of MLA-based array assemblies. Other types of lensing structures and arrays may be used for each one of the lens array assemblies. For instance, each lens array assembly may include an array of GRIN microlensing structures. Each GRIN microlensing structure of the array then corresponds with a respective one of the cells of each lens array assembly. As used herein, the term "cell" is used to refer to a unit of each array assembly. Because, in some cases, an array assembly includes a pair of arrays, a cell may include an FT pair of array elements, one from each array. In other cases (e.g., GRIN cases), a cell corresponds with a single element of the array that provides the equivalent of an FT lensing pair.

Figure 1:
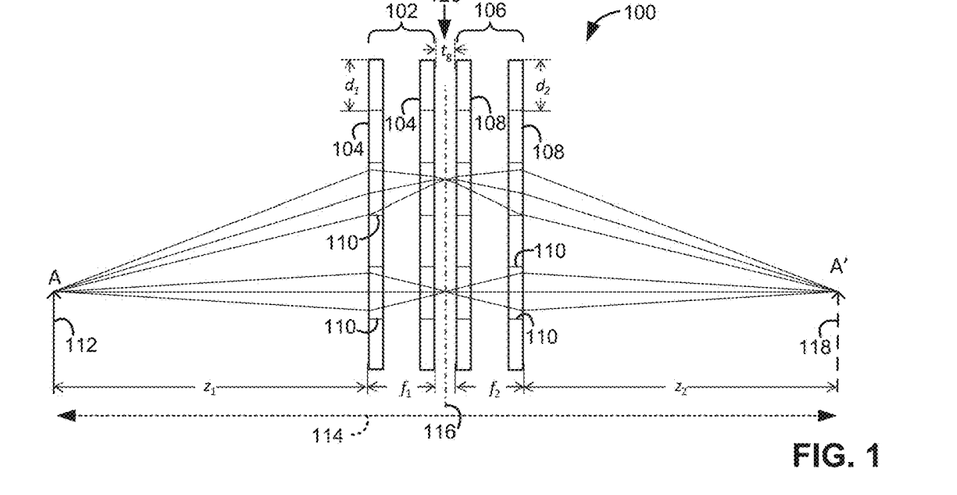
FIG. 1 is a schematic view of a lens system having two lens array assemblies with cells that exhibit Fourier transform lenses in accordance with one example.

FIG. 1 is a schematic view of a lens system 100 configured to operate as an imaging relay. The lens system 100 includes two lens array assemblies. In this example, one assembly of the lens array assemblies of the lens system 100 includes a first pair 102 of in-tandem microlens arrays 104. The other assembly of the lens array assemblies 100 includes a second pair 106 of in-tandem microlens arrays 108. Each lens array assembly has a plurality of cells. As described below, each cell is configured to exhibit a pair of Fourier transform lenses. In this example, each microlens array 104, 108 includes a respective set of constituent lenslets 110, respective pairs of which make up each cell of the lens array assemblies.

Light from an object 112 diffuses as it approaches the lens system 100. The object 112 is separated from the lens system 100 by an object distance $z_1$. A few example rays of light are shown in FIG. 1. The example rays propagate from a point A on the object 112 toward the first pair 102 of arrays 104. In many cases, light from the object 112 encounters each of the lenslets 110 to the extent permitted by the numerical aperture, or acceptance cone, of the microlens array 104.

The microlens arrays 104, 108 of the two array pairs 102, 106 are positioned to achieve relay imaging. Each array 104, 108 is generally disposed, or oriented, along a respective plane, as shown in FIG. 1. The respective planes and, thus, the arrays 104, 108 are separated from one another along an optical axis 114. The arrays 104 of the first pair 102 are spaced from one another by a distance $f_1$. The arrays 108 of the second pair 106 are spaced from one another by a distance $f_2$. The array pairs 102, 106 are spaced from one another by a distance $t_g$ (or D). Each distance is an effective optical distance determined in accordance with the refractive index of the medium through which light passes when transmitted over the particular distance. Each distance is selected in accordance with a function that establishes the image conjugate distance for the relay imaging of the lens system 100. The image conjugate distance is establishing by satisfying the constraints of (1) providing imaging conjugate distances within a lenslet as well as (2) convergence of image content across multiple imaging cells within the assembly, thereby enabling formation of a real, non-inverted image.

The distances $f_1$ and $f_2$ are set in accordance with the focal lengths for the cells, e.g., the lenslets 110 of the arrays 104, 108. The distance $f_1$ is the common focal length of the cells of the first lens array assembly, e.g., the lenslets 110 of the arrays 104. The distance $f_2$ is the common focal length of the cells of the second lens array assembly, e.g., the lenslets 110 of the arrays 108.

The focal length separation of each array 104 of the pair 102 establishes that the array pair 102 implements a Fourier transform of the light emanating from the object 112. For objects at an infinite distance from the first array pair 102, $t_g$ is zero and the Fourier transform is a phase-corrected Fourier transform from the angle space of the light emanating from the object 112 into position space (or spatial frequency space), as explained herein. The array pair 102 provides a representation of the phase-corrected Fourier transform along a plane 116 disposed between the array pairs 102, 106. The plane 116 is accordingly referenced as an intermediate transform plane. For closer object distances, the distance $t_g$ increases, such that the intermediate transform plane 116 exists at a finite distance from and between the arrays 104 and 108. As described below, for a given lenslet design, the distance or optical gap $t_g$ follows a mathematical relationship dependent on object distance along with other lenslet parameters. A stack having a fixed $t_g$ may function reasonably well over a limited range of object distances in proximity to the design object distance.

Use of two-lens in-tandem Fourier transform MLA pairs enables higher spatial frequency content (corresponding to higher angle light) to transmit into the intermediate transform plane without clipping. Such transmission, in turn, allows formation of a Sinc-like function that is more highly resolved, containing higher spatial frequency content, and limited primarily only by MLA acceptance numerical aperture (NA). This in turn allows the converging conelets out of each cell to be stitched forming a core NA without gaps within the solid angle of the NA. Impact on the Fourier transform due to lenslet sag profile may be reduced by using aspheric lenslet profiles, such as a conic constant in the range of −0.25 to −0.4, or other aspheric profiles.

The focal length separation of each array 108 of the pair 106 establishes that the array pair 106 implements a Fourier transform of the light associated with the representation at the intermediate transform plane 116. The Fourier transform is again a phase-corrected transform. The array pair 106 transforms the representation at the intermediate transform plane 116 from angle space back into position space.

The two array pairs 102, 106 are positioned relative to one another along the optical axis 114 to establish that the lens system 100 is an imaging system. That is, the distance D between the two array pairs 102, 106 establishes that the lens system 100 provides an erect image 118 of the object 112. The image 118 is provided at an image conjugate distance $z_2$ from the array pair 108.

The image conjugate distance $z_2$ is established via a function of the object conjugate distance $z_1$ for the object 112, the distance D between the array pairs 102, 106, a first pitch of the first array pair 102, a second pitch of the second array pair 106, and the common focal lengths $f_1$, $f_2$. The function establishes that the light emanating from the object 112 and passing through the constituent lenslets of the in-tandem microlens arrays of the array pairs 102, 106 converges at the image conjugate distance $z_2$. Further details regarding the function are provided hereinbelow in connection with parameters identified in FIG. 1.

For two lenses in tandem, $f_{1a}$ and $f_{1b}$, separated by distance D, the distance $s_i$ after the last lens at which an image of the input object 112, at distance $z_o$ before the first lens, occurs may be defined as $$s_i = \frac{f_{1b}(D(f_{1a} - z_o) + f_{1a}z_o)}{D(f_{1a} - z_o) + f_{1b}z_o + f_{1a}(z_o - f_{1b})}$$

However, when focal lengths $f_{1a}$ and $f_{1b}$ are configured as a Fourier Transform pair, such that $f_{1a}=f_{1b}=f_1$ and separation distance $D=f_{1a}=f_1$, then the image distance of input object A, occurs at distance $s_i$ after the last lens, which simplifies to $z_{g1}$:

$$z_{g1} = \frac{f_1(f_1(f_1 - z_o) + f_1 z_o)}{f_1(f_1 - z_o) + f_1 z_o + f_1(z_o - f_1)} = \frac{f_1^2}{z_o}$$

where $f_1$ is the focal length of each lens of the two-lens in-tandem Fourier transform pair and $z_o$ is the object distance before the first lens.

The foregoing relationship may then be extended to the array context. An array of lenslets, or cells, are formed by pitch d. A portion of light diverging from the object 112 is captured by each cell. Each cell in one array forms a two-lenslet subsystem with a cell in the other array of an array pair. For a solid angle of light from the object 112 that overfills a cell of width near pitch d, the input captured is approximately a Rect function which forms a Sinc-like function near the image of A at the intermediate transform plane defined by, or disposed at, the distance $z_{g1}$ from the second array in the array pair.

The second Fourier transform array pair 106 is placed after the first array pair 102 at gap distance optically equivalent to $t_g=2*z_{g1}$. The configuration thus becomes symmetric. The imaging conjugate distances provided by each subsystem are the same. The images developed by all of the subsystems converge for image formation of the object 112, at distance $z_i$, to form image 118 (see, e.g., point A' corresponding to point A on the object 112). In such cases, the imaging relay becomes a 1:1 relay such that the image distance $z_i$ is substantially equal to the object distance $z_o$.

The intermediate images may be referred to as intermediate transform images of the input object 112, which occur at the intermediate transform plane near half the gap $t_g$, defined previously as distance $z_{g1}$.

The distance, or gap $t_g$, between the two array pairs 102, 106 is determinative of the imaging of a stack of cells. The cell stack includes four cells, one from each array 104, 108. Each cell stack may be considered a constituent sub-system of the lens system 100. The distance between the two array pairs 102, 106 is selected such that imaging is achieved for all rays entering the constituent sub-system at a common image conjugate distance. The distance, or gap $t_g$, increases as the object distance decreases (i.e., the object 112 becoming closer to the lens system 100). The distance, or gap $t_g$, goes to zero as the object distance goes to infinity (or very large distances relative to the dimensions of the lens system 100). In the example of FIG. 1, the two array pairs 102, 106 are spaced apart from one another by a gap 120. The distance, or gap $t_g$, for the function is thus non-zero. The gap 120 may be on an order of, or in the proximity of, the first and second common focal lengths.

The pitch of the lenslets 110 within the arrays 104, 108 governs the convergence of light from all of the lenslets 110. The lenslets 110 of the first array pair 102 have a pitch $d_1$, while the lenslets 110 of the second array pair 106 have a pitch $d_2$. The pitch is selected such that convergence of all optical information across all lenslets 110 of the arrays 104, 108 is achieved. An image is thus formed at the same image conjugate distance across all lenslets 110 of the array 104, 108. The lens system 100 is an example of an imaging relay in which the lenslets 110 of both array pairs 102, 106 have a common pitch. With the pitches $d_1$, $d_2$ equal to one another, the output of the lens system 100 may be telecentric.

Telecentric output may also be provided, on one side of the optical stack, in non-equal pitch cases, i.e., when $d_1$ does not equal $d_2$. In such cases, the pitches of the lenslets 110 in each array 104 of the first array pair 102 are equal to one another, and the pitches of the lenslets 110 in each array 108 of the second array pair 106 are equal to one another. The function simplifies as follows:

$$d_2 = \frac{d_1 z_2 (f_1 + z_1)}{(f_2 + z_2) z_1}$$

The gap $t_g$ is as follows:

$$t_g = z_{g1} + z_{g2}, \text{ where}$$

$$z_{g1} = \frac{f_1^2}{z_1} \text{ and } z_{g2} = \frac{f_2^2}{z_2}.$$

In such case, the pitches are configured such that $d_1 = d_{1b} < d_{2b} = d_2$.

Non-telecentric imaging, on both sides of the optical stack, may also be provided. The rays may be smoothly bent through the lens system 100 by adjusting the respective pitches of the cells within the arrays 104, 108. The lenslets 110 of the arrays 104, 108 may thus be registered (or aligned) with one another or non-registered. In one example, the pitches of all four arrays differ from one another. The pitch $d_1$ for the lenslets 110 becomes $d_{1a}$ and $d_{1b}$ for the first and second arrays 104 of the first array pair 102. The pitch $d_2$ for the lenslets 110 becomes $d_{2a}$ and $d_{2b}$ for the first and second arrays 108 of the second array pair 106. In one positive magnification case, $d_{2b} > d_{2a} > d_{1b} > d_{1a}$. The function then may be expressed as follows (with $z_{g1}$ and $z_{g2}$ defined as set forth above):

$$d_2 = \frac{d_{2b} f_2 z_1 + d_{1b} f_1 z_2 + d_1 z_1 z_2}{z_1 (2 f_2 + z_2)}$$

In such case, the pitches are configured such that $d_1 < d_{1b} < d_{2b} < d_2$.

As shown by the examples described above, the gap $t_g$ is determinative of the imaging of each subsystem of cells, while the relative pitches of the arrays govern the convergence from all the cell subsystems.

The focal lengths of the cells within the arrays 104, 108 may also be used to adjust the image conjugate distance. Non-unity conjugate distances may be achieved when the focal lengths of the lenslets 110 within the arrays 104 are not equal to the focal lengths of the lenslets 110 within the arrays 108. In the example of FIG. 1, the focal lengths of the lenslets 110 within the arrays 104 and 108 are equal to one another.

The term "equal" is used herein to mean exactly equal and effectively equal. Effectively equal may include, for instance, parameters that are equal within a reasonable margin of error, such as a manufacturing tolerance. The parameters values thus need not be exactly equal (e.g., slightly offset) to be considered "equal" as that term is used herein. Any of the parameters described herein as equal in some examples may alternatively be "substantially equal" in other cases. Substantially equal parameter values may be intentionally or unintentionally offset by a slight amount that results in a discernable (e.g., detectable), but insignificant, effect on system output. Any of the parameters described herein as equal in some examples may alternatively be "about equal" in other cases. About equal parameter values may be intentionally or unintentionally offset by a slight amount that results in a discernable (e.g., detectable) effect on system output that may be considered significant in some applications but insignificant in other applications. For example, a slight de-focusing of system output resulting from about equal parameters may be significant in the context of a fingerprint reader, a microscope, or photolithography, but insignificant in the context of a printer or facsimile machine.

Distances referenced herein, such as the width of the gap 120, may differ in practice in accordance with the refractive index of the transmission medium. For example, the above-described functions specify a distance for the gap parameter in connection with transmission through an air gap. The actual width of the gap 120 may differ from the air gap distance if the light is propagating through a medium other than air when traversing the gap 120. The gaps and other distances may thus be optically equivalent distances. In cases using an optical medium other than air, the inner lenslet focal lengths may be adjusted to account for change in curvature required to maintain the Fourier Transform function of each pair. Increase in refractive index in the gap implies smaller lenslet curvature to maintain substantially equal effective focal length for an in-tandem MLA pair. Further, such practice is useful when it is desired to laminate both MLA pairs to form an optical stack that includes a monolithic optical stack without an air gap.

Optical terms such as "collimated", "focused", etc., are used herein to include both the exact condition described by the term as well as conditions near the exact condition. For example, light is considered to be collimated if the light rays are collimated to an effective extent for purposes of the imaging application or usage scenario involved. The resolution of the viewer may thus be taken into account when evaluating whether the optical condition (e.g., collimated, focused) is present.

Figure 2:
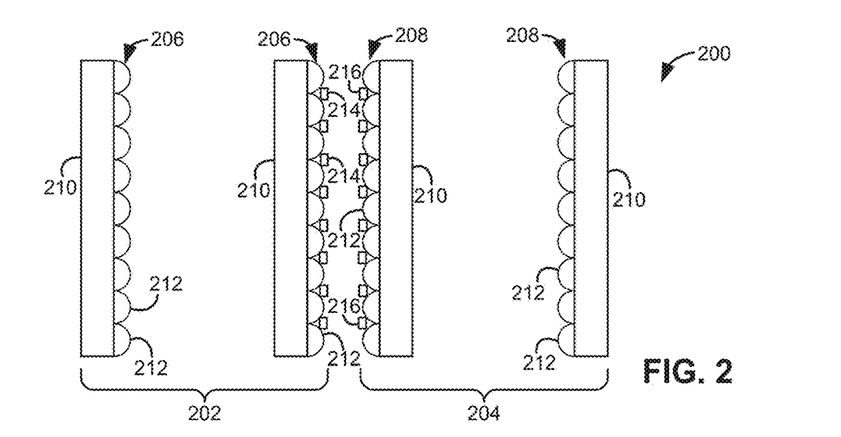
FIG. 2 is a schematic, side view of the lens system of FIG. 1 in accordance with an example having a respective in-tandem pair of microlens arrays (MLAs) for each lens array assembly.

FIG. 2 depicts a side view of a MLA-based lens system 200 in accordance with one example. As in the examples described above, the lens system 200 includes two array pairs 202, 204. The array pair 202 includes arrays 206, and the array pair 204 includes arrays 208. In this example, each array 206, 208 is disposed on a respective substrate 210. The substrates 210 may or may not be similarly configured and constructed. In one example, each substrate 210 is composed of a glass substrate having a thin microlens layer replicated on one surface using UV-cure adhesive resin, which may be cured using ultraviolet light, and a mold master, and each substrate 210 may have a similar thickness.

Each array 206, 208 includes a set of lenslets 212. In one example, each substrate 210 and set of lenslets 212 is integrally formed via injection molding. Alternatively, the lenslets 212 may be formed separately from the substrate 210 and affixed or otherwise secured thereto. For example, the lenslets 212 may be formed, and then applied to the substrates 210 with optically clear adhesive. The pitch and focal length of the lenslets 212 may be equal or offset as described above. Other techniques for forming the lenslets 212 may be used.

Surfaces may be optically coated with anti-reflective (AR) coatings to minimize loss and scatter due to Fresnel reflections. In cases using UV-cure adhesives, a glass master may be utilized to minimize distortion. Other examples include injection molding in a homogenous polymer, such as acrylic or polycarbonate, compression molding of polymer sheets, and nanoprinting. For compression molding, a nickel shim may be formed of a master negative using an electroform nickel process. A master may also be formed using diamond machining, such as plunge cutting a rotating cutter having a profile form for each lenslet, or diamond turning each lenslet. For high accuracy and fill factor, a lithography based glass etching technique may be used to fabricate the MLA master.

Various profiles may be used for each lenslet 212. For example, the lenslets 212 may have aspheric or conic profiles. The extent or degree to which the profiles are aspheric or conic may vary. In some cases, the lenslets 212 may have profiles with conic constants directed to reducing aberrations and/or allow the lens system to accommodate higher numerical apertures (NA).

The arrays 206, 208 are oriented symmetrically about the intermediate transform plane (FIG. 1). Each lenslet 212 of the arrays 206, 208 is a plano-convex structure. The planar side of each structure is adjacent the respective substrate 210. The curved side of each structure is disposed on an inward facing side of each array 206, 208 in the example of FIG. 2. The orientation of the lenslets 212 may vary from the example shown. One example is described below in connection with FIG. 3.

The lenslets 212 may be arranged in a variety of two-dimensional patterns. For example, the lenslets 212 may be disposed in a hexagonal array, a square array, or other arrangement. The lateral shape of each lenslet 212 may vary accordingly.

One or more of the arrays 206, 208 may be pattern or aperture masked. The aperture masking may be directed to limiting the acceptance of the lens system and/or reducing scattered light. Pattern masking may be directed to blocking ambient or other spurious light from being processed by the lens system 200. For instance, ambient light at high angles of incidence upon the lens system 200 is blocked. Blocking the high angle incident light may prevent the spurious light from hopping to a neighboring subsystem of cells. In the example of FIG. 2, the lens system 200 includes aperture stops 214 along the inner array 206 of the first array pair 202, as well as aperture stops 216 along the inner array 208 of the second array pair 204. Fewer, additional, or alternative aperture stops 214, 216 may be provided. For example, other lens systems may not include the aperture stops 216. Aperture stops may be disposed at any one or more of the layers.

The aperture stops may be provided for other purposes. For example, the aperture stops may address aberrations in the lenslets of the arrays.

Aperture masking may be accomplished by using a lithographed aperture hole array layer, such as patterned deposited thin metal oxide or metal, on top of or underneath the replicated layer as by replicating over an aperture-patterned substrate surface, or one or more patterned sheets disposed within the optical stack, e.g., near the inner arrays.

The aperture stops 214, 216 may be provided via a discrete sheet or other layer disposed along the respective array 206, 208. For example, an opaque sheet secured to, or disposed along, the array 206 may include an array of apertures to define the aperture stops 214. Alternatively or additionally, the pattern masking may be provided via a layer deposited or otherwise formed on the respective substrate 210. The layer may be patterned to define the aperture stops 214, 216 before the formation of the lenslets 212.

The aperture stops 214, 216 may be embedded in, or otherwise integrated with, the lenslets 212. For instance, the material of each aperture stop 214, 216 may be deposited on the substrate 210 and then patterned before and/or in connection with the formation of the lenslets 212. Further, a perforated or 'honeycomb' sheet of limited thickness may be disposed between the pairs.

Figure 3:
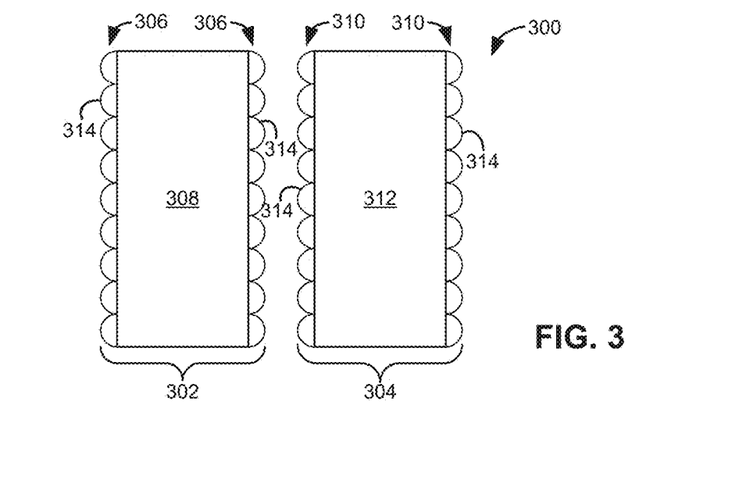
FIG. 3 is a schematic, side view of a MLA-based lens system in accordance with another example.

FIG. 3 depicts another example lens system 300 having array pairs 302, 304. In this case, arrays 306 of the pair 302 are disposed on opposite sides of a substrate 308. Arrays 310 of the pair 304 are disposed on opposite sides of another substrate 312. Each array 306, 310 includes lenslets 314, each of which includes a plano-convex structure. The curved surface of each lenslet 314 faces inward or outward in accordance with the side of the substrate 308, 312 on which the lenslet 314 is disposed.

The lenslets 314 may be arranged, shaped, formed, and otherwise configured as described above. The lens system 300 may have alternative or additional aspects in common with the examples described above. For example, in some cases, the lens system 300 includes aperture stops on one or more of the arrays 306, 310.

The arrays of the examples of FIGS. 2 and 3 may be separated from one another by air. Other media may be used. For example, low refractive index adhesive or laminate materials may be disposed between the arrays.

Figure 9:
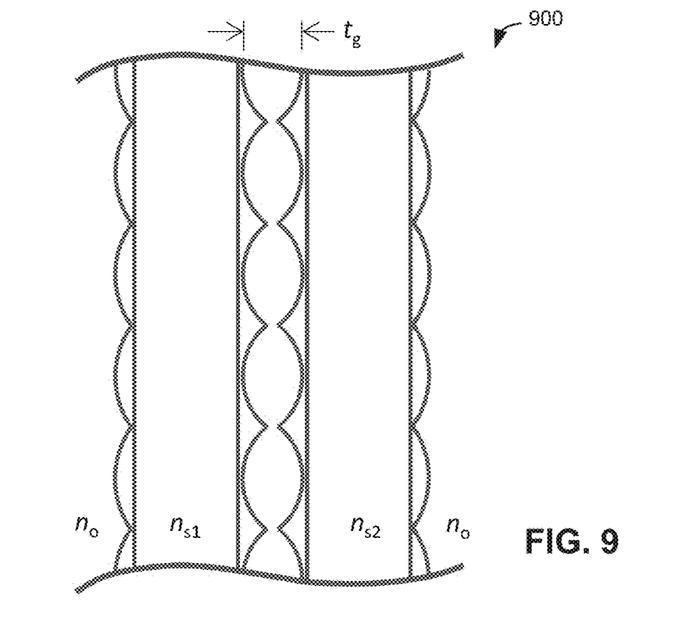
FIG. 9 is a schematic, side view of a lens system in accordance with an example in which each lens array assembly has a respective in-tandem pair of MLAs disposed on opposing sides of a respective substrate.
Figure 10:
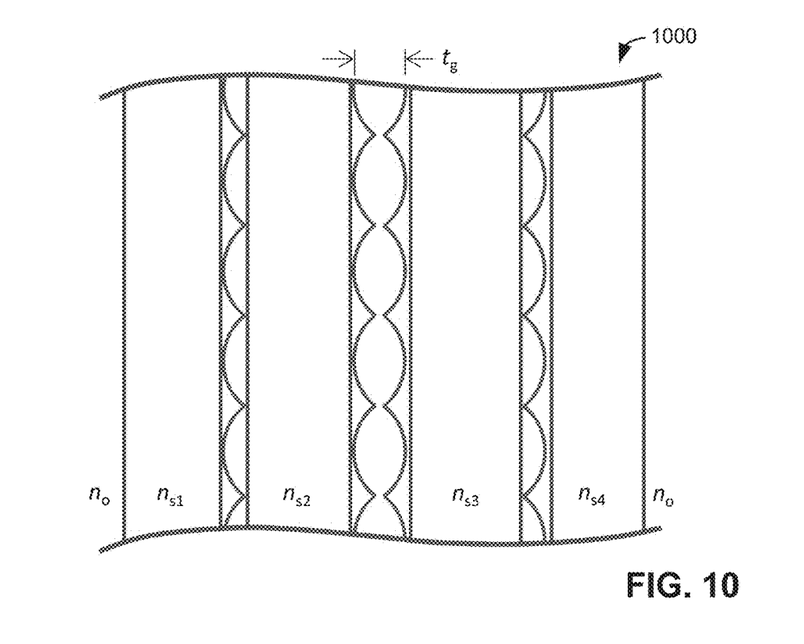
FIG. 10 is a schematic, side view of a lens system in accordance with an example in which each lens array assembly has a respective in-tandem pair of MLAs with each MLA disposed on a respective substrate.

Lenslet orientations other than those shown in FIGS. 2 and 3 may be used. Further examples are shown in FIGS. 9 and 10.

The lens systems may differ from the examples of FIGS. 2 and 3 in other ways. For example, the arrays of each pair may be in contact with one another. In four-substrate cases, the arrays may be in contact as a result of the thickness of the inner substrates.

Additional substrates or other structures may be used in other examples. For example, two substrates may be disposed before and after the array assemblies of FIG. 3 to provide, for instance, additional structural support or protection.

A four layer MLA stack may be configured to accommodate conjugate distances from infinity to close proximity. However, the gap distance $t_g$ may increase substantially for object distances approaching the focal length of the first array. In such cases, additional, outer MLAs may be added in order to enable the inner gap distance to be substantially reduced, and further provide a focus NA having no gaps. Further, the outer MLAs may provide added freedom in design as each surface profile may be tailored to improve optical performance.

Figure 4:
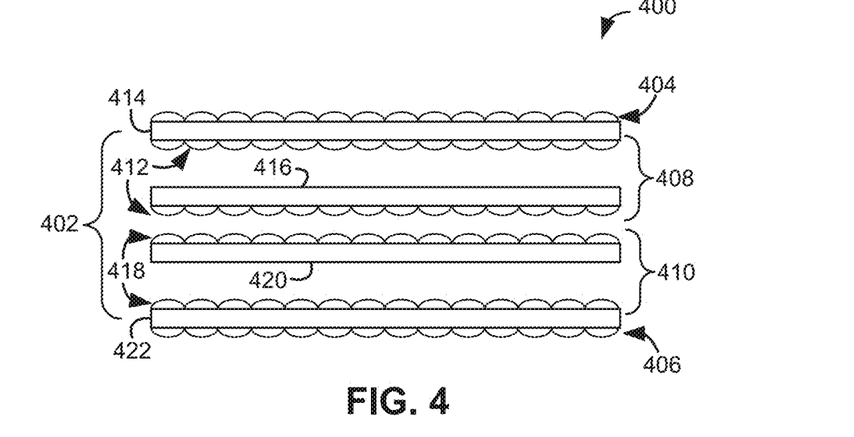
FIG. 4 is a schematic, side view of a lens system having an input MLA, an output MLA, and an imaging relay core of two in-tandem pairs of MLAs between the input and output MLAs in accordance with one example.

FIG. 4 depicts an example of a lens system 400 having six microlens arrays (MLAs). The lens system 400 includes a four-layer imaging relay core 402, an input array 404, and an output array 406. The input array 404 may be positioned and otherwise configured to collimate or otherwise prepare incoming light for incidence upon the core 402. Collimation may be useful in cases in which the light is diffusing or emanating from an object that may be too close to the lens system 400 to be considered effectively at infinity. The output array 406 may be positioned and otherwise configured to focus the image at an adjusted image conjugate distance closer than the image conjugate distance established by the core 402. The lens system 400 may thus provide the output at a desired image conjugate distance. As in the examples described above, the arrays of the lens system 400 may be oriented and positioned symmetrically about the intermediate transform plane within the core 402.

The imaging relay core 402 may be configured in accordance with one or more of the examples described above. In this example, the core 402 may be configured similarly to the lens system 200 of FIG. 2. For instance, the core 402 includes a first array pair 408 and a second array pair 410. Arrays 412 of the first pair 408 are disposed on two separate substrates 414, 416 while arrays 418 of the second pair 410 are disposed on another two separate substrates 420, 422.

One or more of the substrates may have arrays disposed on opposite sides. In the example of FIG. 4, the input array 404 is disposed on an outer side of the substrate 414. The curved surface of each lenslet of the input array 404 faces outward to collimate incoming light. A respective one of the arrays 412 is disposed on an inner side of the substrate 414. The output array 406 is disposed on an outer side of the substrate 422. The curved surface of each lenslet of the output array 406 faces outward to focus the light at a desired image conjugate distance. A respective one of the arrays 418 is disposed on an inner side of the substrate 422. Other orientations and configurations of the various arrays may be used.

The input and output arrays 404, 406 may be aligned with, or registered to, one another, as well as to one or more of the arrays 412, 418 of the core 402. In this example, the input and output arrays 404, 406 have the same pitch as the arrays 412, 418. The pitches may differ in other cases.

Other characteristics of the input and output arrays 404, 406 may be directed to achieving an appropriate amount or degree of collimation and focusing. For instance, the focal length of the cells of the input array 404 may be set to accommodate an expected object conjugate distance. Similarly, the focal length of the cells of the output array 406 may be set to achieve a desired image conjugate distance.

Figure 5:
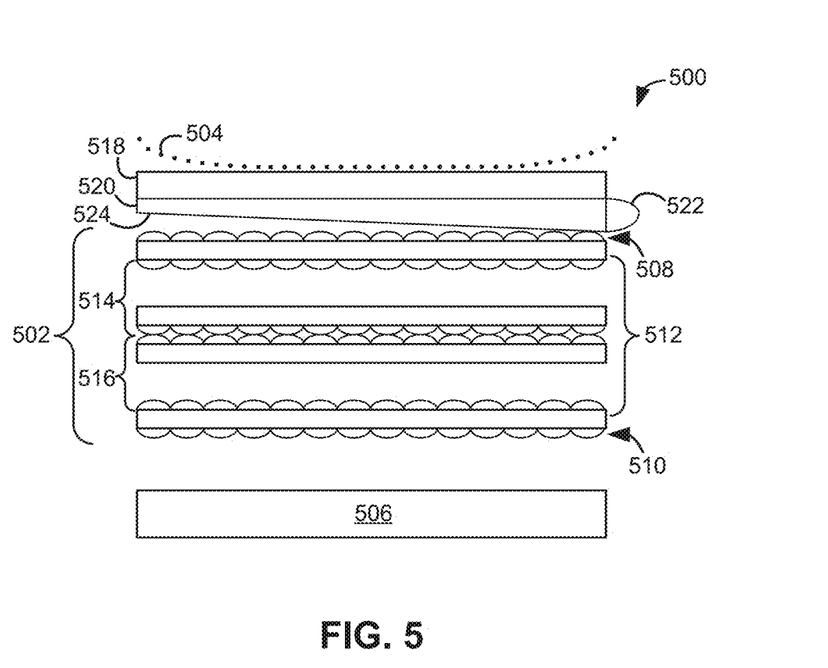
FIG. 5 is a schematic, side view of a touch surface imaging device having the lens system of FIG. 4.

FIG. 5 depicts a fingerprint reader 500 (or image capture device) that includes an MLA-based imaging relay 502 in accordance with one example. The fingerprint reader 500 may be a component of an electronic device, such as a tablet, mobile phone, or other portable device. Alternatively, the fingerprint reader 500 may be a standalone electronic device (e.g., a peripheral device).

The imaging relay 502 provides an image of the target object 504, in this case, a fingerprint pattern, at the input of an image sensor 506. The imaging relay 502 includes an input array 508, an output array 510, and an imaging relay core 512 between the input and output arrays 508, 510. Except as noted below, these and other components of the imaging relay core 512 may be constructed and configured as described above in connection with the example of FIG. 4. For instance, the core 512 includes first and second array pairs 514, 516, each of which may be configured in accordance with any one or more of the examples described above. In one example, one or more of the arrays of the pairs 514, 516 includes an aperture stop layer having an array of masks positioned and sized to block ambient light directed at the first pair at angles outside of an acceptance of the first pair, as described above.

The input array 508 is disposed between the fingerprint pattern 504 and the first pair 514 to collimate light emanating from the fingerprint pattern 504. The output array 510 is positioned beyond or behind the second pair 516 along the optical axis to focus the image at an adjusted image conjugate distance closer than the image conjugate distance established by the imaging relay core 512. In the example of FIG. 5, the input and output arrays 508, 510 are positioned and otherwise configured to allow the first and second array pairs 514, 516 to be in contact with one another.

The input and output arrays 508, 510 may allow the width of the gap and, thus, the parameter $t_g$ in the above-described functions, to be zero. The input array 508 is configured to collimate the light from the fingerprint pattern 504. The first and second array pairs 514, 516 may then be configured such that all of the lenslet focal lengths are equal to one another, and that all of the array pitches are equal to one another. As a result, the function mandates that the output of the imaging relay core 512 is also collimated (i.e., both the object and image conjugate distances, apparent to the core, approach infinity). The collimated output is then focused by the output array 510 to establish an adjusted image conjugate distance. The image sensor 506 is then disposed beyond or behind the output array 510 at the adjusted image conjugate distance.

In other cases, the focal lengths may be about equal or substantially equal in other cases and yet, for instance, still provide a suitable high quality image of the fingerprint pattern 504. Other combinations of the parameters may be used to reach a similar result.

The fingerprint reader 500 includes a number of components directed to illuminating the target object, i.e., the fingerprint pattern 504. The illumination is provided in a manner that still allows the light reflected by the target object to pass through the lens system of the fingerprint reader 500 to reach the image sensor 506. In this example, the fingerprint reader 500 is disposed under a transparent cover 518. The transparent cover 518 is disposed forward of, or above, the input array 508. The transparent cover 518 has a front surface at which the target object is disposed. In some cases, the transparent cover 518 is a cover glass of a display of an electronic device of which the fingerprint reader 500 is a component. In other cases, the transparent cover 518 is a portion of an outer surface of the electronic device. For example, the transparent cover 518 may be integrated with a shell or housing of the electronic device.

The illumination light is provided via a light guide 520 disposed between the transparent cover 518 and the input array 508. The light guide 520 may wedge or a fresnellated wedge or a sheet having a low scatter bumpy surface, such as a two-degree full width half maximum (FWHM) surface relief diffuser surface. The light guide 520 may be composed of a sheet, plate, or other thin layer of acrylic, polycarbonate or glass. One or more light sources 522 are mounted or otherwise disposed along one or more edges of the light guide 520. In some cases, an array of light emitting diode (LED) devices may be used as the light sources 522. The light generated by the light sources 522 may have a near infrared wavelength. However, the characteristics of the light source(s) 522 may vary. For example, visible light may be used. Further, blue light may not penetrate as deep into the skin, and thus be a useful option for a fingerprint reader.

Light injected into the light guide 520 by the light source(s) 522 undergoes total internal reflection until an extraction mechanism redirects the light toward the target object. In the example of FIG. 5, a wedge is used as the extraction mechanism, which changes the angle of light by twice the input angle upon every bounce. In order to avoid simultaneous extraction from both sides, a dichroic coating 524 is disposed along a bottom surface of the light guide 520, which forces the light to be extracted primarily in the upward direction. The dichroic coating 524 has a response (i.e., transmission or reflection) curve that varies with incidence angle, and by setting the spectral transition point to be slightly above the illuminant wavelength range at normal incidence, light can be transmitted for low angle of incidence (AOI) and reflected at high AOI. Thus, illumination light is extracted, by the wedge, with high AOI through the transparent cover, biased upward due to the dichroic coating 524, diffusely reflected from the fingertip, and transmitted through the stack. A portion of that light is captured within the acceptance of the MLA stack in order to be relayed onto the image sensor. Other angular selective coatings or extraction mechanisms may be used.

The light guide 520 may be wedge-shaped to gradually increase the likelihood that the angle of incidence of the light propagating across the light guide 520 falls within a range that allows the light to exit the light guide 520. In that way, the light is extracted from the light guide 520 uniformly (or near uniformly) across the lateral extent (i.e., the imaging area) of the fingerprint reader 500.

The target object then scatters the illumination light, now having target object content, at all angles. A portion of that scattered light passes through the light guide 520. For example, the reflectivity of the light guide 520 (and the dichroic coating 524) is low for light having an angle of incidence near zero. Some or all of that light is thus directed toward the acceptance of the lens system of the imaging relay 502. Such low incidence angle light is then optically imaged, or relayed, to the plane of the image sensor 506 via the imaging relay 502.

The light guide arrangement addresses how illumination of the fingerprint pattern 504 may be challenging in cases in which the transparent cover 518 has a coating (e.g., a hydrophobic or oleophobic coating for cleaning). The refractive index of the coating may be lower than the refractive index of the transparent cover 518 (e.g., the cover glass). As a result, the illumination within the coverglass may not transmit effectively to the top surface where the finger is placed due to light being reflected by total internal reflection (TIR). An illumination light guide is useful in such cases. However, light may be extracted directly by the finger, e.g., by wetting of finger oils through frustrated total internal reflection (FTIR), and then diffusely reflected back through and into the acceptance of the MLA stack to be imaged onto the image sensor. In such cases, light may be coupled into the cover glass in other ways, including use of a prism coupler or a prismatic film array coupler laminated to the underside of the cover glass. Thus, other extraction and illumination techniques may be used. For example, any extraction technique may be used as long as the diffusely scattered light from the target object 504 is allowed to pass into the lens system of the imaging relay 502.

The imaging relay 502 allows the total track length (and thus thickness) of the fingerprint reader 500 to be relatively short given the size of the imaging area. For example, one or more dimensions of the imaging area for a fingerprint pattern may be greater than 7.5 mm (e.g., a diameter of 10-12 mm). The imaging relay 502 nevertheless allows the fingerprint reader 500 to have a total track length, or thickness, of, for example, about 4.5 mm. As a result, the fingerprint reader 500 is well suited for use in tablets and other thin form factor devices. The nature of the imaging relay 502 allows the lateral extent (e.g., length and width) of the arrays of the imaging relay 502 to be scaled to reach or adjust to a desired imaging area size.

A thin profile is achieved despite the spacing of the image sensor 506 from the imaging relay 502. In cases in which the imaging relay 502 is symmetrical, the spacing may correspond with the thickness of the transparent cover 518 and the light guide 520. In one example, cover glass having a thickness of 0.5 mm is used as the transparent cover 518. In such cases, the image sensor 506 is spaced from the output array by at least that amount.

The image sensor 506 may utilize or include CMOS sensors and/or other photodetectors and detection technologies. For example, print-based sensors may be used.

The taper of the light guide 520 may introduce a slight shift in conjugate distance focus at various positions along length thereof. This effect may be addressed (e.g., avoided) by adding a small tilt between the stack of the imaging relay 502 and the light guide 520. The components of the fingerprint reader 500 may thus be coplanar with the top of the transparent cover 518. Alternatively or additionally, the image relay 502 may be tilted toward or at angle of the taper.

Alternative or additional illumination techniques for use with the imaging relay 502 include (i) a holographic guide illuminator, which extracts high incidence angle light with upward parity bias, and allows transmittance of low incidence angle light, (ii) a fresnellated wedge 'flat' light guide with pitch (or sparseness) selected to minimize diffraction artifacts (e.g., dichroic coating or other angular selective coating), (iii) sparsely spaced, fine-sized divets on the bottom face of light guide 524 for light extraction (to minimize diffraction impact), and/or (iv) a front light having partially reflective embedded facets (i.e., buried coated fresnel).

Coverglass for tablet computers or mobile phones is commonly masked using black or opaque screened ink on the underside of the coverglass. In order to allow near-infrared light to pass through coverglass, but substantially block visible light to hide the hole in masking, a dye-based ink that transmits infrared light but blocks visible light may be used within a patterned aperture region of the more common black or opaque ink. If blue light is used, a dye-based ink that blocks most of the visible light except blue may be used to reasonably hide the aperture.

In other cases, fingerprint readers may be provided via a four-array lens system, such as the imaging relay core 412. Suitable relay imaging may be provided without the input and output arrays 508, 510. For example, the distance between the array pairs in the imaging relay core 412 may be adjusted to accommodate the conjugate distances presented by the fingerprint reader scenario.

Figure 6:
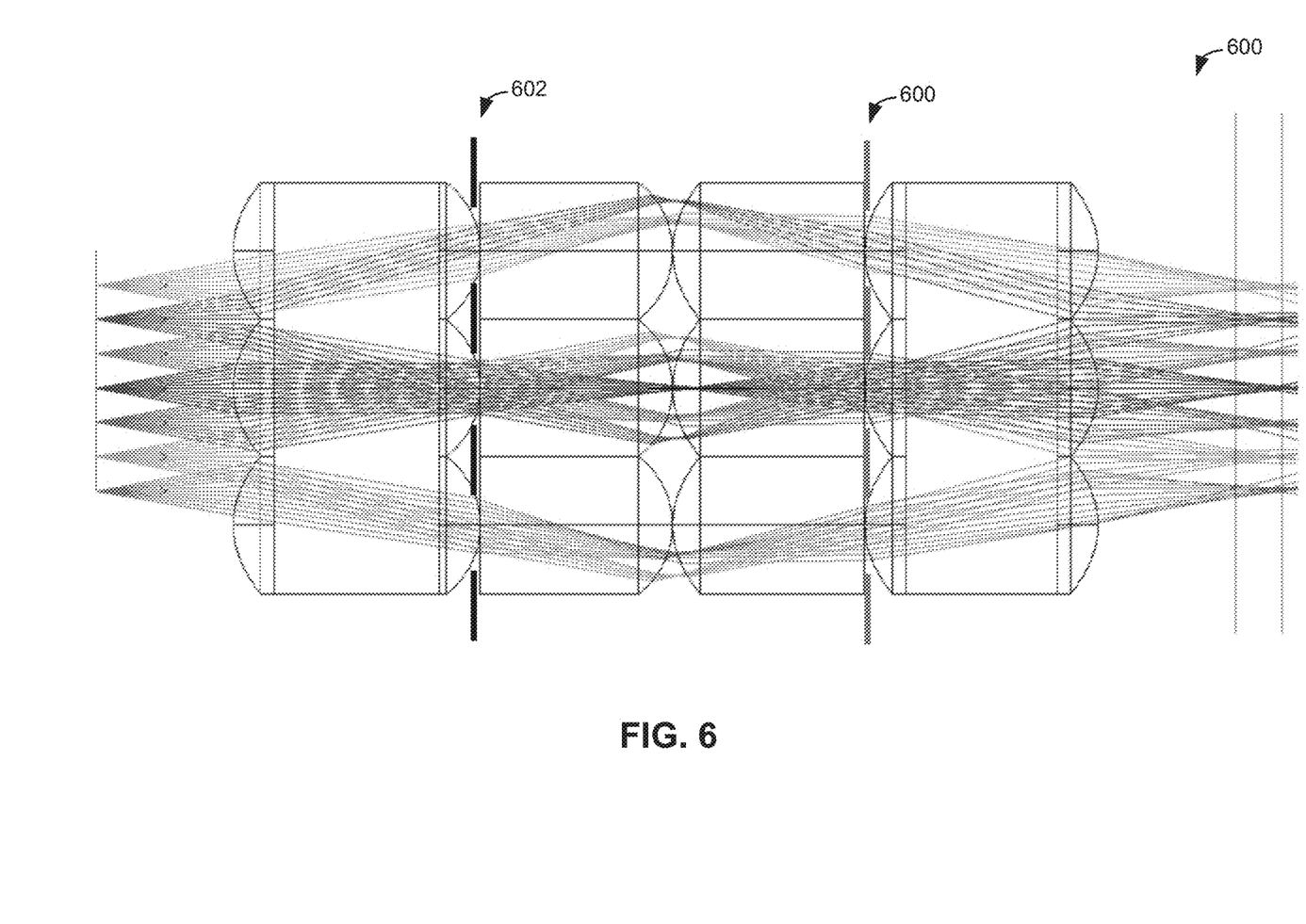
FIG. 6 is a ray trace diagram for the lens system of FIG. 4 in accordance with one example.

FIG. 6 is a ray trace diagram for a lens system 600 having a six-array arrangement. As described above, the six-array arrangement has an input array, an output array, an imaging relay core of two lens array assemblies between the input and output arrays. Each lens array assembly includes an MLA pair. In this example, aperture stops 602, 604 are disposed within the imaging relay core, in between the array pair of each lens array assembly. The aperture stops 602, 604 limit the acceptance of the lens system 600 as shown via the ray tracing. Aperture stops may be provided at any layer between the input and output arrays in other cases.

The ray tracing shown in FIG. 6 may correspond with an object having a 0.75 mm dimension (e.g., width). With that object size, the total track length of the lens system 600 may be about 4.3 mm.

Figure 7:
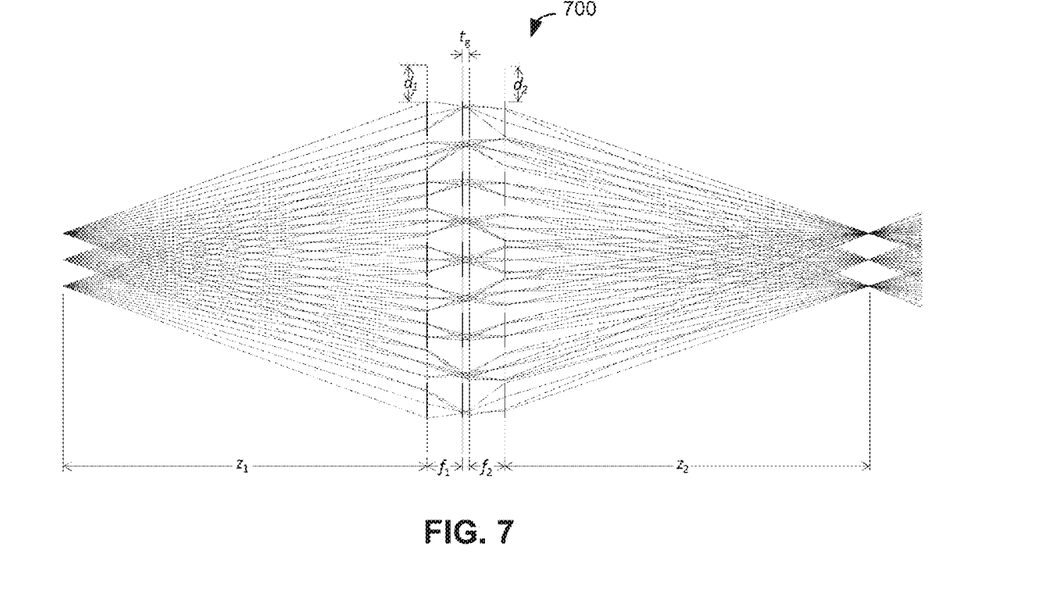
FIG. 7 is a ray trace diagram for a lens system having two lens array assemblies in accordance with one example.

FIG. 7 is a ray tracing diagram to provide a paraxial illustration for a four-layer lens system 700 that may be used as, for instance, an imaging relay 700. The pitch, focal length, and conjugate distance parameters of the lens system may be selected in accordance with the function described above to achieve, for instance, 1:1 relay imaging.

Figure 8:
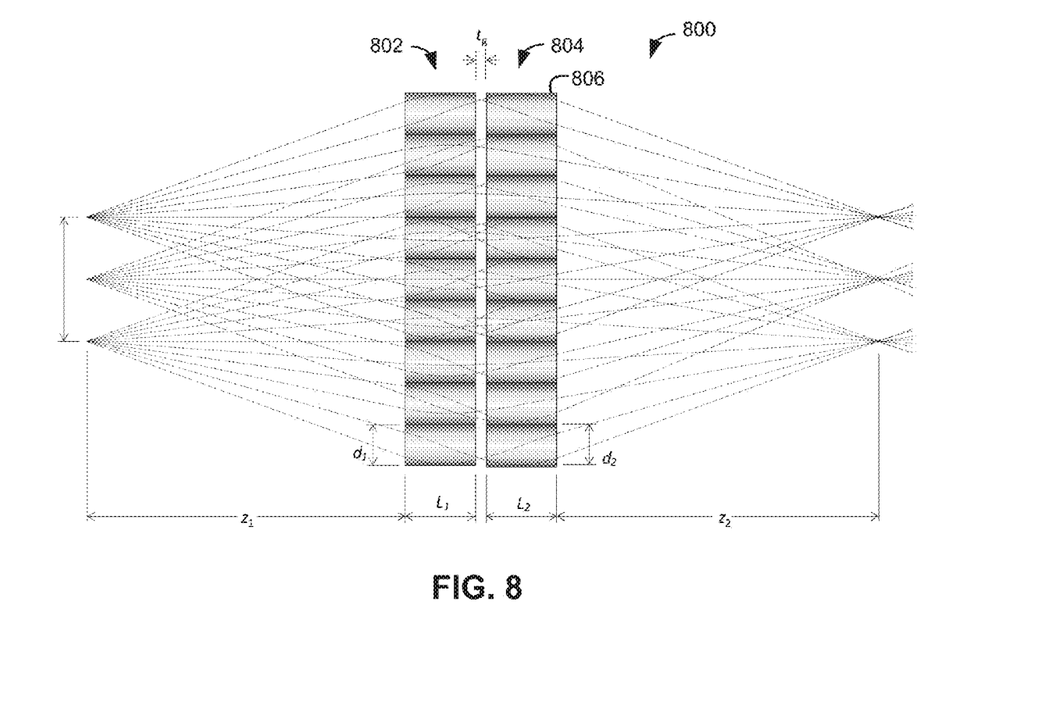
FIG. 8 is a ray trace diagram for a lens system in accordance with an example in which each lens array assembly includes a respective array of graded-index microlensing structures.

FIG. 8 shows a GRIN-based lens system 800 in which two lens array assemblies 802, 804 are positioned relative to one another for relay imaging. Each assembly 802, 804 includes an array of GRIN microlensing structures 806.

Each structure 806 provides one of the cells of the lens array assembly 802, 804. To that end, each structure 806 is configured to exhibit, or act as, a pair of Fourier transform lenses. A parabolic refractive index profile enables each cell to function as a series of two in-tandem Fourier transform pairs, in order to satisfy the above-described constraints of (1) image conjugate formation for each cell and (2) convergence of imaging from multiple cells. Each assembly 802, 804 may thus be configured as a plate having a thickness that provides the equivalent function of the above-described Fourier transform cells formed via a lenslet pair.

Extra-mural absorption (EMA) glass may be used to block light from encountering the edge of an adjacent cell. Other absorbing coatings or layers may be used.

For given total track length (TTL) between image conjugates, the object and image distances may be placed by design to coincide with the outer faces of the GRIN lens length, thus having image conjugates at the outer surfaces, or may be placed at an air gap distance from each of the two outer surfaces. However, the structures 806 are unlike previous GRIN arrays used for image relay or image transfer that have been based on designing a single GRIN lens length, thus only functioning for a specific pair of conjugate distances. By realizing herein that a fundamental element required in enabling the formation of images in array-based imaging is a series of two Fourier Transform (FT) equivalent sub-systems within each cell of the array, and the Fourier Transform equivalent length for a GRIN lens may be defined as the length for which a collimated input beam forms a focus at the second output surface of the GRIN lens, an air gap (zero to non-zero) defined by image conjugate relations may be disposed between the two Fourier Transform equivalent length GRIN arrays in order to provide array-based relay imaging, which may add versatility of the system to be adjusted for any pair of equal image conjugate distances using two FT-equivalent length GRIN arrays which have the same effective focal length, and further may be adjusted to support unequal conjugate distances by use of two FT equivalent length GRIN arrays which have different focal length. Such arrays may be made thinner by use of GRIN fibers or drawing an array of GRIN rods into a boule having accurate placement of array spacing, then slicing and polishing faces, in a similar fashion as coherent fiber optic faceplates are fabricated, but with tight control of pitch layout. Further, while a GRIN lens is a lens which exhibits a continuous lensing effect or optical power anywhere along its length, a Fourier Transform equivalent subsystem may also be formed using two or more lens arrays. While a single lens array may be used to form an array of output images which appear to be Fourier Transforms in terms of intensity, these are not Fourier transforms in terms of phase, or telecentrically corrected upon output. The simplest form of an FT equivalent subsystem would then include two lenses having the same focal length placed in tandem at a separation distance equal to the effective focal length. However, it is clear from the GRIN lens FT equivalent length case explained above, that more than two lenses having various optical power may be used in series to achieve the equivalent function of a FT-equivalent subsystem. The simplest case of using microlens arrays to achieve array-based imaging involves use of two in-tandem Fourier Transform pairs of microlenses, having an air gap or optical path length gap distance defined by image conjugate relations which will be defined below. In such way, any lens array, including microlens arrays or GRIN lens arrays or GRIN microlens arrays may be utilized to form an imaging relay, as explained below.

FIGS. 9 and 10 depict alternative lens orientations for use in the lens systems described herein. FIG. 9 shows a two-substrate lens system 900. FIG. 10 shows a four-substrate system 1000. Low-index adhesives may be disposed between the arrays.

Figure 11:
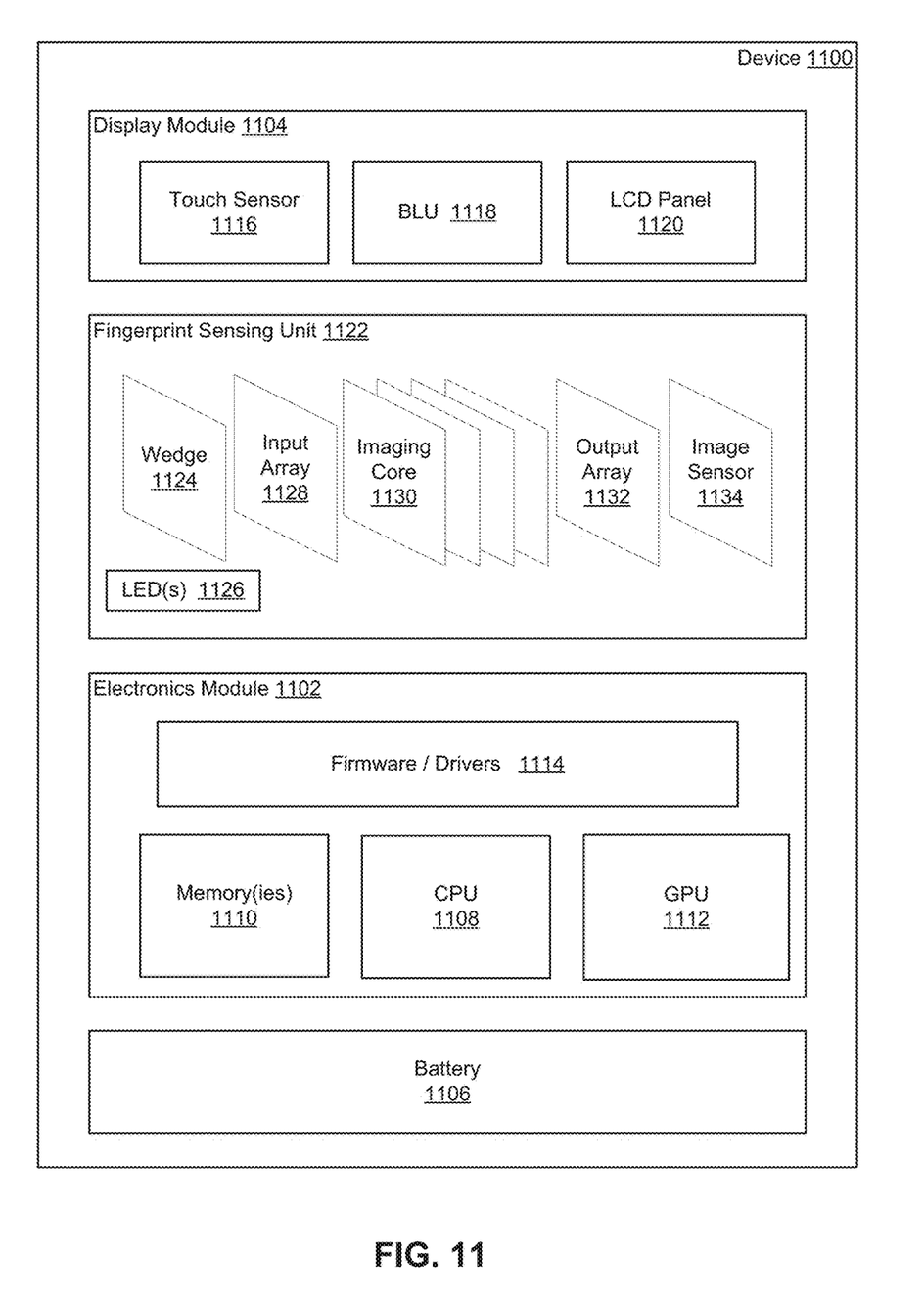
FIG. 11 is a block diagram of an electronic device having an MLA relay-based fingerprint reader in accordance with one example.

FIG. 11 shows an electronic device 1100 in which the relay imaging of the above-described examples may be incorporated in connection with fingerprint detection. The electronic device 1100 has an electronics module 1102 and a display module 1104 (or subsystem), and a battery 1106. The electronic device 1100 may include additional, fewer, or alternative components. For example, the display module 1104 may be integrated with the electronics module 1102 and/or other components of the electronic device 1100 to a varying extent. For instance, the electronics module 1102 and/or the display module 1104 may include a graphics subsystem of the electronic device 1100. Any number of display modules or systems may be included. In this example, the device 1100 includes a processor 1108 and one or more memories 1110 separate from the display module 1104. The processor 1108 and the memories 1110 may be directed to executing one or more applications implemented by the device 1100. The display module 1104 generates a user interface for an operating environment (e.g., an application environment) supported by the processor 1108 and the memories 1110. The processor 1108 may be a general-purpose processor, such as a central processing unit (CPU), or any other processor or processing unit. Any number of such processors or processing units may be included.

In the example of FIG. 11, the electronics module 1102 includes a graphics processing unit (GPU) 1112 and firmware and/or drivers 1114. The GPU 1112 may be dedicated to graphics- or display-related functionality and/or provide general processing functionality, which may or may not include graphics-related processing in connection with fingerprint detection. Some of the components of the electronics module 1102 may be integrated. For example, the processor 1108, the one or more of the memories 1110, the GPU 1112, and/or the firmware 1114 may be integrated as a system-on-a-chip (SoC) or application-specific integrated circuit (ASIC). The electronics module 1102 may include additional, fewer, or alternative components. For example, the electronics module 1102 may not include a dedicated graphics processor, and instead rely on the CPU 1108 or other general-purpose processor to support the graphics-related functionality of the electronic device 1100. The electronics module 1102 may include additional memory (or memories) to support display-related and/or fingerprint detection processing.

In the example of FIG. 11, the display module 1104 includes a touch sensor 1116, a backlight unit (BLU) 1118, and an LCD panel or unit 1120. The touch sensor 1116, the backlight unit 1116, and/or the LCD unit 1120 may be directed to forming a display separate from, or integrated with to any desired extent, the fingerprint detection hardware. Additional, fewer, or alternative display components may be provided. For example, in some cases, the display module 1104 does not include a touch sensor unit.

The electronic device 1100 includes a fingerprint sensing unit 1122 distinct from the touch sensor 1116. The fingerprint sensing unit 1122 may or may not be positioned or integrated with the display module 1104. In some cases, the fingerprint sensing unit 1122 is disposed outside of the display area of the display module 1104 along a front face of the housing of the electronic device 1100. The location of the fingerprint sensing unit 1122 may vary.

The fingerprint sensing unit 1122 may be configured in accordance with one or more of the examples described above. A wedge-shaped light guide 1124 is provided to direct light from an edge-mounted LED array 1126 toward the fingerprint target, while still allowing light scattered by the fingerprint to reach an imaging relay of the fingerprint sensing unit 1122. In the example of FIG. 11, the imaging relay is configured as a six-layer stack, including an input array 1128, an imaging core 1130, and an output array 1132. As described above, the output array 1132 focuses the light provided by imaging core 1130 at an input plane of an image sensor 1134.

The device 1100 may be configured as one of a wide variety of computing devices, including, but not limited to, handheld or wearable computing devices (e.g., tablets and watches), communication devices (e.g., phones), laptop or other mobile computers, personal computers (PCs), and other devices. The device 1100 may also be configured as an electronic display device, such as a computer monitor, a television, or other display or visual output device. In such cases, the device 1100 may not include one or more of the above-described components, such as the battery 1106.

In one aspect, a lens system includes a first lens array assembly including a first plurality of cells, each cell of the first plurality of cells configured to exhibit a pair of Fourier transform lenses, and a second lens array assembly including a second plurality of cells, each cell of the second plurality of cells configured to exhibit a pair of Fourier transform lenses. The first and second lens array assemblies are positioned relative to one another along an optical axis of the lens system such that an image of an object is provided at an image conjugate distance from the second lens array assembly.

In another aspect, a lens system includes a first pair of in-tandem microlens arrays, each microlens array of the first pair including a respective set of cells, each cell having a first common focal length, and a second pair of in-tandem microlens arrays, each microlens array of the second pair including a respective set of cells, each cell having a second common focal length. The in-tandem microlens arrays of the first pair are separated from one another along an optical axis of the lens system by the first common focal length such that the microlens arrays of the first pair are configured to provide a representation of a Fourier transform of light emanating from an object, the representation provided along a plane disposed between the first and second pairs. The in-tandem microlens arrays of the second pair are separated from one another along the optical axis of the lens system by the second common focal length such that the microlens arrays of the second pair are configured to provide an image of the object via Fourier transformation of the representation. The first and second pairs of in-tandem microlens arrays are positioned relative to one another along the optical axis of the lens system such that the image of the object is provided at an image conjugate distance from the second pair of in-tandem microlens arrays.

In yet another aspect, a fingerprint reader includes a light source, a light guide having an edge at which the light source is disposed, the light guide configured to illuminate a fingerprint pattern in front of the light guide, first and second pairs of in-tandem microlens arrays, the respective microlens arrays of the first and second pairs being spaced apart from one another to implement a phase corrected Fourier transform, the first and second pairs of in-tandem microlens arrays being positioned relative to one another such that an image of an object is provided at an image conjugate distance from the second pair of in-tandem microlens arrays, an input microlens array disposed in front of the first pair to prepare light emanating from the fingerprint pattern for the first and second pairs, an output microlens array positioned behind the second pair to adjust the image conjugate distance, and an image sensor disposed at the adjusted image conjugate distance to capture a representation of the fingerprint pattern.

In connection with any one of the aforementioned aspects, the fingerprint readers, imaging relays, or lens systems may alternatively or additionally include any combination of one or more of the following aspects or features. The image conjugate distance is established via a function of an object conjugate distance for the object, a distance between the first and second lens array assemblies, a first pitch of the first plurality of cells, a second pitch of the second plurality of cells, a first focal length of the first plurality of cells, and a second focal length of the second plurality of cells. The function establishes that light emanating from the object and passing through the respective cells of the first and second plurality of cells converges at the image conjugate distance. The first and second lens array assemblies are spaced apart from one another by a gap. The gap is on an order of the first and second common focal lengths. The first and second lens array assemblies are in contact with one another. The first and second pluralities of cells have a common pitch. The first and second plurality of cells have common focal lengths equal to one another. The first lens array assembly includes a first pair of in-tandem microlens arrays, each microlens array of the first pair including a respective set of constituent lenslets, each constituent lenslet having a first common focal length. The second lens array assembly includes a second pair of in-tandem microlens arrays, each microlens array of the second pair including a respective set of constituent lenslets, each constituent lenslet having a second common focal length. The in-tandem microlens arrays of the first pair are separated from one another along an optical axis of the lens system by the first common focal length. The in-tandem microlens arrays of the second pair are separated from one another along the optical axis of the lens system by the second common focal length. The first and second pairs of in-tandem microlens arrays are positioned relative to one another along the optical axis such that the image is provided at the image conjugate distance. The lens system further includes an input microlens array disposed between the object and the first pair of in-tandem microlens arrays to collimate light emanating from the object, and an output microlens array positioned behind the second pair of in-tandem microlens arrays along the optical axis to focus the image at an adjusted image conjugate distance closer than the image conjugate distance. The lens system further includes a transparent cover disposed forward of the input microlens array, the transparent cover having a front surface at which the object is disposed, a light guide plate disposed between the transparent cover and the input microlens array, and a light source disposed along an edge of the light guide plate to inject source light into the light guide plate. The light guide plate is wedge-shaped to extract the source light and illuminate the object at the surface of the transparent cover. The lens system further includes an image sensor disposed behind the output microlens array at the adjusted image conjugate distance established by the output microlens array.

The first lens array assembly includes a first array of graded-index microlensing structures. Each graded-index microlensing structure of the first array corresponds with a respective one of the first plurality of cells. The second lens array assembly includes a second array of graded-index microlensing structures. Each graded-index microlensing structure of the second array corresponds with a respective one of the second plurality of cells.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

The foregoing description is given for clearness of understanding only, and no unnecessary limitations should be understood therefrom, as modifications within the scope of the invention may be apparent to those having ordinary skill in the art.

What is claimed is:

1. A lens system comprising:
a first lens array assembly comprising a first plurality of cells, each cell of the first plurality of cells configured to exhibit a pair of Fourier transform lenses that implement a phase-corrected Fourier transform; and
a second lens array assembly comprising a second plurality of cells, each cell of the second plurality of cells configured to exhibit a pair of Fourier transform lenses that implement a phase-corrected Fourier transform;
wherein the first and second lens array assemblies are positioned relative to one another along an optical axis of the lens system such that an image of an object is provided at an image conjugate distance from the second lens array assembly, and
wherein a distance between the first and second lens array assemblies is dependent on an object conjugate distance of the object, the image conjugate distance, focal lengths of the Fourier transform lenses of the first and second pluralities of cells, and respective pitches of the first and second pluralities of cells.

2. The lens system of claim 1, wherein:
the image conjugate distance is established via a function of the object conjugate distance for the object, the distance between the first and second lens array assemblies, a first pitch of the first plurality of cells, a second pitch of the second plurality of cells, a first focal length of the first plurality of cells, and a second focal length of the second plurality of cells; and
the function establishes that light emanating from the object and passing through the respective cells of the first and second plurality of cells converges at the image conjugate distance.

3. The lens system of claim 1, wherein the first and second lens array assemblies are spaced apart from one another by a gap.

4. The lens system of claim 3, wherein the gap is on an order of the first and second common focal lengths.

5. The lens system of claim 1, wherein the first and second lens array assemblies are in contact with one another.

6. The lens system of claim 1, wherein the first and second pluralities of cells have a common pitch.

7. The lens system of claim 1, wherein the first and second plurality of cells have common focal lengths equal to one another.

8. The lens system of claim 1, wherein:
the first lens array assembly comprises a first pair of in-tandem microlens arrays, each microlens array of the first pair comprising a respective set of constituent lenslets, each constituent lenslet having a first common focal length;
the second lens array assembly comprises a second pair of in-tandem microlens arrays, each microlens array of the second pair comprising a respective set of constituent lenslets, each constituent lenslet having a second common focal length;
the in-tandem microlens arrays of the first pair are separated from one another along an optical axis of the lens system by the first common focal length;
the in-tandem microlens arrays of the second pair are separated from one another along the optical axis of the lens system by the second common focal length; and
the first and second pairs of in-tandem microlens arrays are positioned relative to one another along the optical axis such that the image is provided at the image conjugate distance.

9. The lens system of claim 8, further comprising:
an input microlens array disposed between the object and the first pair of in-tandem microlens arrays to collimate light emanating from the object; and
an output microlens array positioned behind the second pair of in-tandem microlens arrays along the optical axis to focus the image at an adjusted image conjugate distance closer than the image conjugate distance.

10. The lens system of claim 9, further comprising:
a transparent cover disposed forward of the input microlens array, the transparent cover having a front surface at which the object is disposed;
a light guide plate disposed between the transparent cover and the input microlens array; and
a light source disposed along an edge of the light guide plate to inject source light into the light guide plate;
wherein the light guide plate is wedge-shaped to extract the source light and illuminate the object at the surface of the transparent cover.

11. The lens system of claim 9, further comprising an image sensor disposed behind the output microlens array at the adjusted image conjugate distance established by the output microlens array.

12. The lens system of claim 1, wherein:
the first lens array assembly comprises a first array of graded-index microlensing structures;
each graded-index microlensing structure of the first array corresponds with a respective one of the first plurality of cells;
the second lens array assembly comprises a second array of graded-index microlensing structures; and
each graded-index microlensing structure of the second array corresponds with a respective one of the second plurality of cells.

13. A lens system comprising:
a first pair of in-tandem microlens arrays, each microlens array of the first pair comprising a respective set of lenslets, each lenslet having a first common focal length; and
a second pair of in-tandem microlens arrays, each microlens array of the second pair comprising a respective set of lenslets, each lenslet having a second common focal length;
wherein:
the in-tandem microlens arrays of the first pair are separated from one another along an optical axis of the lens system by a distance equal to the first common focal length such that the microlens arrays of the first pair are configured to provide a representation of a phase-corrected Fourier transform of light emanating from an object, the representation provided along a plane disposed between the first and second pairs;

the in-tandem microlens arrays of the second pair are separated from one another along the optical axis of the lens system by a distance equal to the second common focal length such that the microlens arrays of the second pair are configured to provide an image of the object via a phase-corrected Fourier transformation of the representation;

the first and second pairs of in-tandem microlens arrays are positioned relative to one another along the optical axis of the lens system such that the image of the object is provided at an image conjugate distance from the second pair of in-tandem microlens arrays; and a distance between the first pair of in-tandem microlens arrays and the second pair of in-tandem microlens arrays is dependent on an object conjugate distance of the object, the image conjugate distance, the first and second common focal lengths, and respective pitches of the first and second pairs of in-tandem microlens arrays.

14. The lens system of claim 13, wherein the image conjugate distance is established via a function of the object conjugate distance for the object, the distance between the first and second pairs, the first and second common focal lengths, a first pitch of the first pair, and a second pitch of the second pair.

15. The lens system of claim 13, wherein the distance is zero such that the first and second pairs are in contact with one another.

16. The lens system of claim 13, wherein the first and second pitches are equal to one another.

17. The lens system of claim 13, wherein the first and second common focal lengths are equal to one another.

18. The lens system of claim 13, further comprising:
an input microlens array disposed between the object and the first pair to collimate light emanating from the object;
an output microlens array positioned behind the second pair along the optical axis to focus the image at an adjusted image conjugate distance closer than the image conjugate distance;
a transparent cover disposed forward of the input microlens array, the transparent cover having a front surface at which the object is disposed;
a light guide disposed between the transparent cover and the input microlens array; and
a light source disposed along an edge of the light guide to inject source light into the light guide;
wherein the light guide is wedge-shaped to extract the source light and illuminate the object at the surface of the transparent cover.

19. A fingerprint reader comprising:
a light source;
a light guide having an edge at which the light source is disposed, the light guide configured to illuminate a fingerprint pattern in front of the light guide;
first and second pairs of in-tandem microlens arrays, the respective microlens arrays of the first and second pairs being spaced apart from one another to implement a phase corrected Fourier transform, the first and second pairs of in-tandem microlens arrays being positioned relative to one another such that an image of an object is provided at an image conjugate distance from the second pair of in-tandem microlens arrays, wherein each microlens array of the first pair comprising a respective set of lenslets, each lenslet having a first common focal length, and wherein each microlens of the second pair comprising a respective set of lenslets, each lenslets having a second common focal length;
an input microlens array disposed in front of the first pair to prepare light emanating from the fingerprint pattern for the first and second pairs;
an output microlens array positioned behind the second pair to adjust the image conjugate distance; and
an image sensor disposed at the adjusted image conjugate distance to capture a representation of the fingerprint pattern;
wherein a distance between the first pair of in-tandem microlens arrays and the second pair of in-tandem microlens arrays is dependent on an object conjugate distance of the object, the image conjugate distance, the first and second common focal lengths, and respective pitches of the first and second pairs of in-tandem microlens arrays.

20. The fingerprint reader of claim 19, wherein the input microlens array is configured to collimate the light emanating from the fingerprint pattern.

* * * * *